United States Patent [19]

Sterling

[11] 4,136,423

[45] Jan. 30, 1979

[54] CABLE CLAMP AND BRACKET

[75] Inventor: Maurice Sterling, Willow Grove, Pa.

[73] Assignee: Eby Company, Philadelphia, Pa.

[21] Appl. No.: 849,323

[22] Filed: Nov. 7, 1977

[51] Int. Cl.² .............................................. F16G 11/06
[52] U.S. Cl. ................................ 24/122.6; 24/135 R;
24/81 CC; 339/246; 248/68 CB; 403/399
[58] Field of Search ............. 24/81 CC, 135 R, 122.6;
339/246; 248/68 B; 403/399; 174/94 S

[56] References Cited

U.S. PATENT DOCUMENTS

| 278,882 | 6/1883 | Chase .................................. 24/135 R |
| 1,489,835 | 4/1924 | Kietz ..................................... 339/246 |
| 1,807,462 | 5/1931 | Zehnder ............................... 339/246 |
| 2,762,027 | 9/1956 | Strobel ................................. 339/246 |
| 3,019,282 | 1/1962 | Husted .................................. 339/246 |

FOREIGN PATENT DOCUMENTS

| 1245233 | 7/1967 | Fed. Rep. of Germany ........ 24/81 CC |
| 693832 | 9/1930 | France ..................................... 339/246 |
| 96752 | 12/1960 | Netherlands ........................... 24/81 CC |
| 242434 | 5/1946 | Switzerland ............................. 339/246 |

*Primary Examiner*—Bernard A. Gelak
*Attorney, Agent, or Firm*—Stanley Bilker

[57] ABSTRACT

Electrical cable clamp includes a body portion having a pair of channels, each for nesting one or more cables in abutting disposition and a movable jaw adapted to be drawn compressively against the nested cables while accommodating obliquely for differences in clamped cross-section within the respective channels. The body portion comprises a single sheet metal stamping formed into open-ended boxlike configuration embodying a generally flat base with a pair of lateral walls spaced intermediate opposed end walls, the edges of the lateral walls defining with the next adjacent end wall longitudinally spaced constraints along the channel permitting the clamped cables to belly therebetween. Outwardly turned ears on the body portion enables the clamp to be coupled to a slotted bracket.

4 Claims, 6 Drawing Figures

CABLE CLAMP AND BRACKET

SUMMARY OF THE INVENTION

This invention relates to electrical cable clamps, and more particularly relates to a clamp which is adapted to mechanically retain a plurality of cables in fixed disposition with each other and simulaneously couple in strain relieved configuration the conductive tubular shields of such cables to a common electrical ground.

BACKGROUND OF THE INVENTION

In the electrical field, especially in telephone communication and transmission, it is frequently desirable to clamp a selective number of cables from a cable bundle in fixed disposition with each other preliminary to directing certain of the clamped cables to a certain location or zone. Such cables usually include a plurality of individual wire conductors which are encapsulated within an outer covering encased about a tubular extruded or braided sheath, preferably copper, which acts as an electrical shield for transmissions through the wire conductors themselves. The encircling conductive shield of these cables are usually coupled to a common electrical ground by way of a clamp compressively contacting the metallic sheath from which a portion of the outer cover has been skinned or stripped. The cables themselves are of various diameters depending upon the number and gauge of the individual wire conductors.

In the past, it has been the usual practice to provide a cable clamp wherein only a single cable was embraced by each jaw of a stacked array so that the cable in each set of jaws was retained in spaced parallel disposition with respect to the other clamped cable elements. Such prior cable clamps tended to distort the cables excessively and required excessive pressures in order to prevent loosening. In addition to these drawbacks, such clamps were likely to be expensive owing to the intricate nature of the cast or machine parts from which the clamp was assembled. Moreover, the use of a clamping arrangement in which only a single cable was retained within one set of jaws of a stacked set of such jaws necessarily increased the overall size of the cable clamp. Added to the mass of metal embodied within the clamp with consequent augmentation in cost and detracted from the ability of the clamp to function with uniform pressure upon the various cables being integrated. Yet another difficulty experienced with prior cable clamps was the problem of coupling them to a housing or bracket while at the same time threading or nesting of the individual cables within the jaws, such difficulty resulting from the unstable nature of the coupling mechanism which could not restrain rotational movement or twisting of the clamp either prior to or during the clamping procedure.

It is therefore an object of this invention to provide an electrical cable clamp for retaining one or more cables in fixed disposition with respect to each other while employing a minimum number of component parts.

Another object of this invention is to provide a cable clamp for electrically coupling the tubular shield of such cables to a common electrical ground while acting as a strain relief for the cable's individual wire elements.

Yet another object of this invention is to provide a cable clamp which grips at longitudinally spaced portions along the cables retained therein so as to insure adequate contact pressure without undue pinching or overclamping.

Still another object of this invention is to provide a cable clamp which can accommodate cables of unequal diameter and cross-section.

Yet still another object of this invention is to provide a cable clamp which is readily coupled to a bracket which carries a bundle of such cables.

A further object of this invention is to provide a cable clamp and bracket wherein the clamp is restrained from rotational and twisting action during assembly or mounting.

Yet a further object of this invention is to provide a cable clamp for retaining a plurality of cables within an assembly of minimum size.

Other objects of this invention are to provide an improved device of the character described which is easily and economically produced, sturdy in construction and highly efficient and effective in operation.

DESCRIPTION OF THE DRAWINGS

With the above and related objects in view, this invention consists of the details of construction and combination of parts as will be more fully understood from the following detailed description when read in conjunction with the accompanying drawings in which.

DETAILED DESCRIPTION

Figure 1:
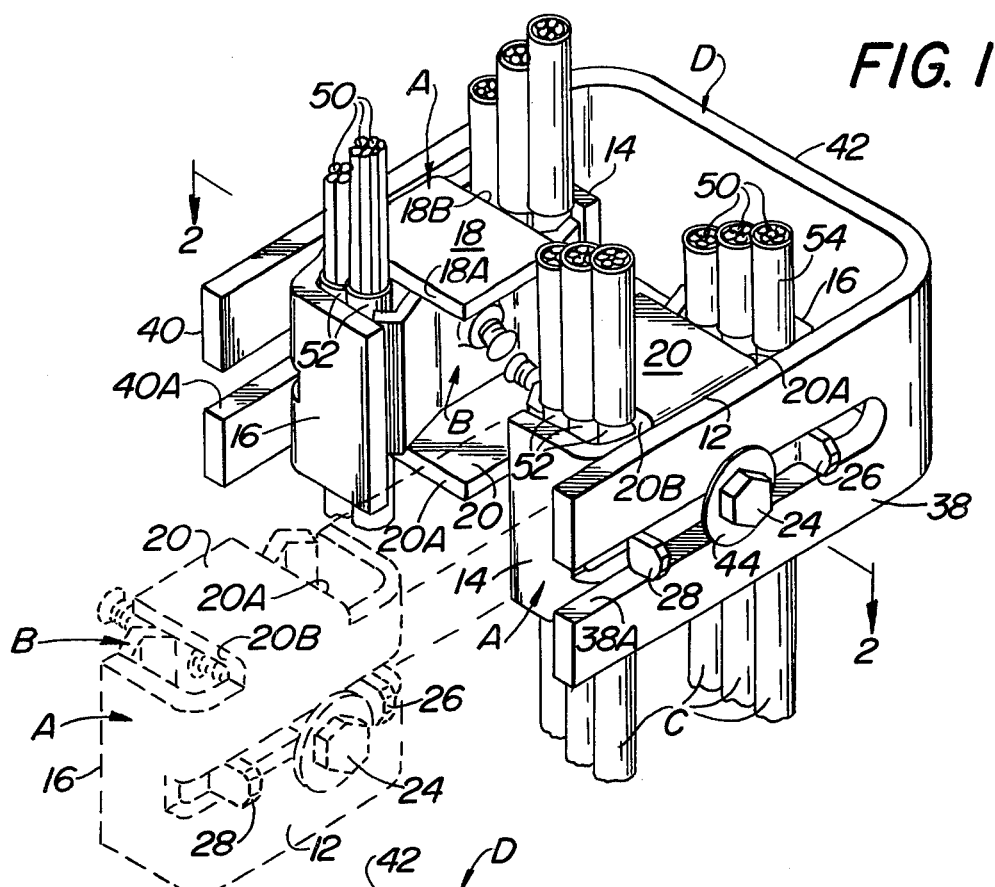
FIG. 1 is a perspective view, and partly exploded, of a cable clamp and bracket embodying this invention.

Referring now in greater detail to the drawings in which similar reference characters refer to similar parts, I show a cable clamp for retaining one or more cables C in fixed disposition with each other and adapted to couple the electrical shield of such cables to a common electrical ground. The electrical cable clamp of this invention includes a body portion, generally designated as A, which permits nesting of one or more cables within each of two symmetrically disposed channels or guideways therein, a jaw member B adapted to be drawn into compressive engagement with the nested cables, and a bracket, generally designated as D, for mounting one or more cable clamps.

The clamp body A is preferably fabricated of a highly conductive metal, such as tin plated brass in sheet form, which is stamped and formed into generally open-ended boxlike configuration comprising a substantially flat base 12 having a pair of end walls 14 and 16 integrally projecting at right angles thereto. A pair of opposing lateral walls 18 and 20 are spaced intermediate the end walls 14 and 16. Coextensive edges 18A and 20A of the lateral walls form one channel with end wall 14 while edges 18B and 20B form the second channel with end wall 16. The base 12 includes a centrally disposed opening which is adapted to receive a bolt 24. The bolt 24 threadedly engages the jaw member B and is maintained in coupled disposition therewith by upsetting the end of such bolt at 24A. Ears 26 and 28 are punched out of the base 12 in order to restrain clamp rotation during nesting of the cables and securing said clamp to said bracket D.

The jaw member B is also preferably made of a highly conductive material, such as brass, and is of generally gull-shaped configuration. A central boss 30 at the middle of the jaw B includes a tapped opening in which the bolt 24 is threadedly received, the upset end 24A of the bolt maintaining the jaw B in coupled relationship with the body portion A. A pair of wings 34 and 36 project symmetrically from the central boss 30, the span of the wings being slightly less than the distance between the interior surfaces of the end walls 14 and 16. The angled orientation of the wings 34 and 36 define clamping faces for compressing against the cables C contained within the underlying channels when the bolt 24 threadedly draws the jaw B down within the body A. The clearance between the threads of the bolt 24 and the tapped hole of boss 30 together with the tolerance between the neck of the bolt and the opening 22 of body portion A enables the jaw B to skew when the clamped cross-section in the symmetrically disposed channels is unequal.

The bracket D is basically a U-shaped strap having a pair of legs 38 and 40 extending from a medial bight portion 42, each leg being slotted at 38A and 40A respectively to receive ears 26 and 28 of the clamp body A as well as the neck of the bolt 24. The bolt 24 also carries a Belville washer 44 for applying residual spring pressure and conforming to the underlying surfaces in abutment therewith when the bolt is caused to skew as a result of differences in cable thickness within the symmetrically disposed channels.

Figure 2:
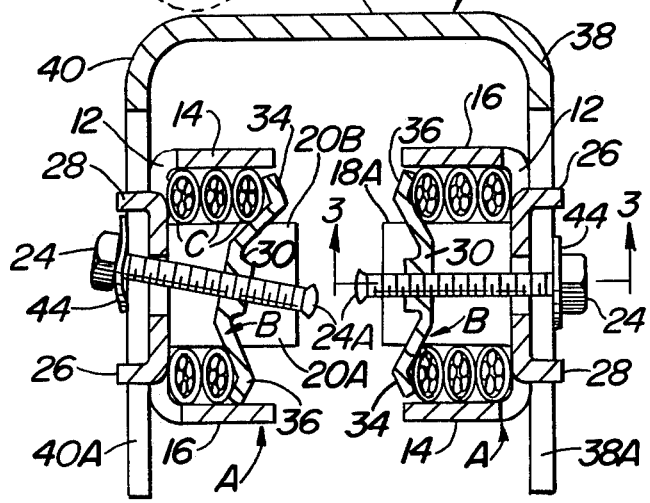
FIG. 2 is a sectional view taken along lines 2—2 of FIG. 1.

The cables C which are adapted to be utilized with the present invention in general constitute a plurality of individually insulated wire filaments 50 contained within a metallic shielding sheath 52 all encapsulated within an insulated cover or jacket 54. In practice of the instant invention, the insulative jacket 54 is skinned or stripped back over a portion corresponding to the breadth across the lateral walls 18 and 20 to expose the metallic sheath 52. One or more cables C with their exposed shields 52 are nested within each channel of the body portion A and the bolt 24 tightened to draw the jaw B into compressive engagement with such cables. As shown in FIG. 2, where the number of cables within the spaced channels is different (or where the diameter of the cables C in each channel is unequal), the jaw B as well as the bolt 24 is allowed to skew in order to accommodate for the variance. It is also important to note that only the edges 18A, 18B, 20A and 20B of the lateral walls bear against the cables per per se thereby permitting the straddled portion of the cables to belly inwardly under the jaw member B so that the abutting cable thicknesses are free to expand both within and outside of the clamp body A. It is this accommodating action that enables a larger plurality of cables to be embraced within a single clamp with uniform pressure thereby elminating the need for partitioning stacked jaws which would otherwise increase clamp size for a given number of cables of a given diameter. Also contributing to the even distribution of pressure is the resilient nature of the sheet metal end walls 14 and 16 which are adapted to flex to some extent when the jaw B is drawn down.

Figure 3:
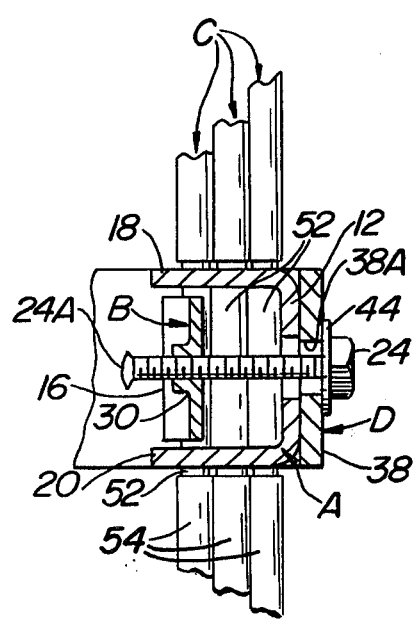
FIG. 3 is a sectional view taken along lines 3—3 of FIG. 2.

In the solid lined portion of FIG. 1, and in FIGS. 2 and 3, the bracket D is employed in combination with the clamp and acts as both a grounding strap as well as a mounting device therefor. When used in combination with the bracket D, the bolt 24 and its underlying washer 44 is clamped against the legs 38 or 40 after sliding the ears through the slots 38A or 40A thereof. However, the clamp of the present invention may also be employed alone, as shown in the dotted line portion of FIG. 1, wherein the bolt 24 and its underlying washer 44 are drawn down against the base 12 of the body portion A. In either case, the jaw B is permitted to skew within the body portion A when the clamped cross-section of cable differs within the spaced channels.

In FIGS. 1, 2 and 3, the washer 44 and bolt are used to loosely retain the clamp in bracket D while the cables C are being nested within the channels, the ears 26 and 28 acting as anti-torquing or anti-rotational devices within the plane of the base 12 during the threading of the cables C under the jaw B and during tightening of the bolt 24.

Figure 4:
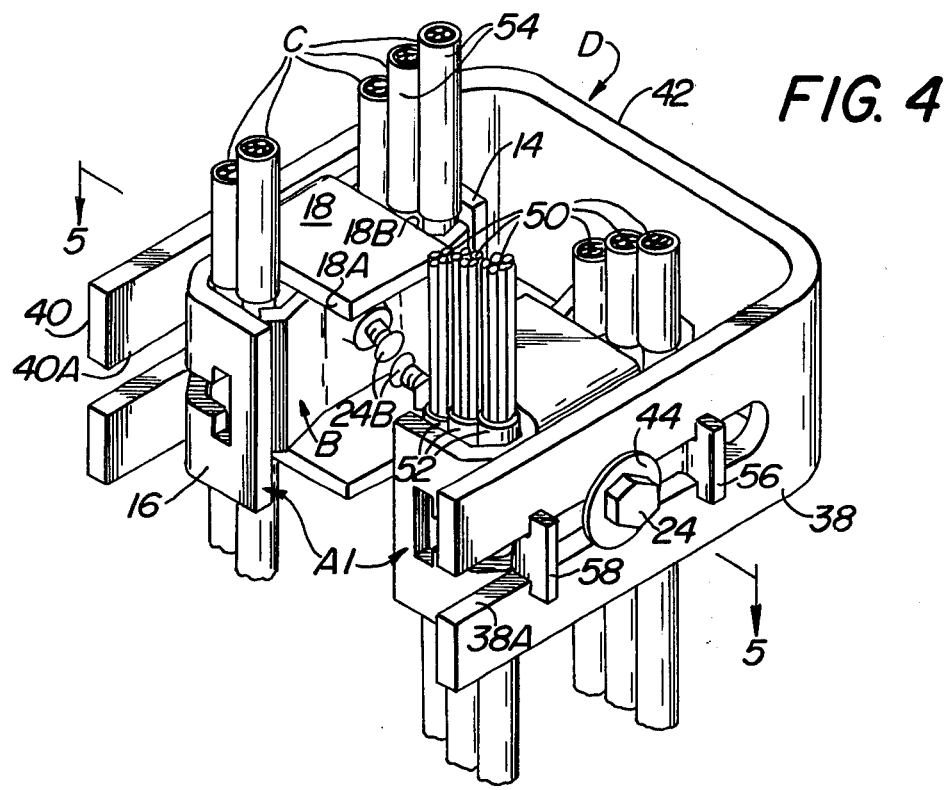
FIG. 4 is a perspective view of a modified form of the cable clamp embodied in this invention.
Figure 5:
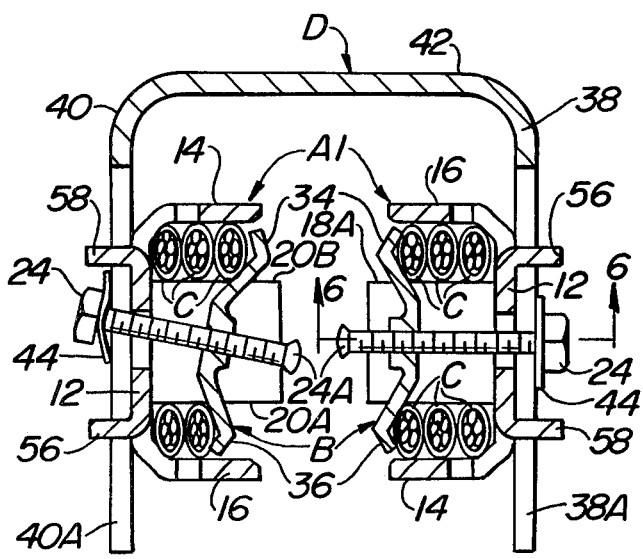
FIG. 5 is a sectional view taken along lines 5—5 of FIG. 4.
Figure 6:
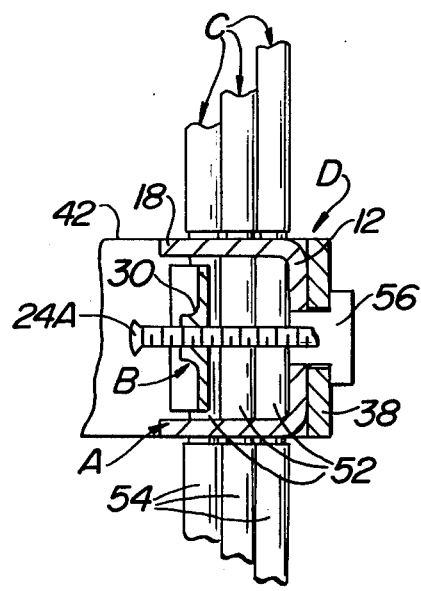
FIG. 6 is a sectional view taken along lines 6—6 of FIG. 5.

In FIGS. 4, 5 and 6, there is shown a modified clamp body A1 employing T-shaped retaining lugs 56 and 58 which are adapted to hang and support the clamp within the slots 38A and/or 40A while the particular cables of the bundle are being nested within the channels of the body portion A thereby facilitating the clamping procedure. That is, the T-shaped configuration of the lugs 56 and 58 not only prevents rotation within the plane of the base 12, but also maintains the surface of base 12 in contact with the bracket leg even without contribution of the bolt 24, thus providing an anti-torquing or anti-twisting mechanism in two planes.

As is apparent from the foregoing description, the use of a sheet metal stamping provides for economy in fabrication by allowing the ears 26 and 28 or the lugs 56 and 58 to be punched out of the respective bases 12 without adding additional metal. Furthermore, the use of a sheet metal stamping enables a flexible end wall 14 and 16 construction which can apply uniform distribution of pressure in opposition to the spaced transverse gripping action of the edges 18A, 18B, 20A and 20B thereby diminishing overclamping tendencies.

Although this invention has been described in considerable detail, such description is intended as being illustrative rather than limiting, since the invention may be variously embodied without departing from the spirit thereof, and the scope of the invention is to be determined as claimed.

I claim:

1. An electrical cable clamp for retaining one or more multi-conductor cables in fixed disposition comprising a body portion and a jaw movable with respect thereto, said body portion constituting a resilient sheet metal stamping formed into hollow open-ended boxlike configuration including a substantially flat base, planar end walls extending at generally right angles to opposed margins of said base, said walls being outwardly yielding, and a pair of lateral walls spaced intermediate said end walls whereby the edges of said lateral walls define a pair of U-shaped channels with the adjacent end wall, said jaw interfitting between said lateral walls and having a pair of symmetrically disposed concave wings having an apex portion and locationally mounted adjacent said end walls and slidably contiguous with respect to said end walls for preventing pinching of said cables between said wings and end walls, and means to draw said jaw into compressive engagement with cables nested within said channels.

2. The cable clamp of claim 1 wherein said means to draw comprises a bolt threadedly engaging a tapped hole centrally disposed within said jaw and so constructed and arranged to permit skewing of the jaw with respect to the channels in said body portion.

3. The cable clamp of claim 2 including a U-shaped bracket having a pair of legs with slots therein, and ears on said body portion slidably received within the slots.

4. The cable clamp of claim 3 wherein said ears are T-shaped in configuration.

* * * * *